US 7,043,016 B2

(12) United States Patent
Roelse

(10) Patent No.: US 7,043,016 B2
(45) Date of Patent: May 9, 2006

(54) SUBSTITUTION-BOX FOR SYMMETRIC-KEY CIPHERS

(75) Inventor: Petrus Lambertus Adrianus Roelse, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 884 days.

(21) Appl. No.: 09/896,197

(22) Filed: Jun. 29, 2001

(65) Prior Publication Data
US 2002/0027987 A1 Mar. 7, 2002

(30) Foreign Application Priority Data
Jul. 4, 2000 (EP) .................................. 00202326

(51) Int. Cl.
*H04K 1/00* (2006.01)
*H04L 9/00* (2006.01)

(52) U.S. Cl. ............................ 380/29; 380/46; 380/47; 380/28

(58) Field of Classification Search .................. 380/29
See application file for complete search history.

(56) References Cited

U.S. PATENT DOCUMENTS

| | | | | |
|---|---|---|---|---|
| 4,972,476 | A * | 11/1990 | Nathans | 713/186 |
| 5,796,837 | A * | 8/1998 | Kim et al. | 380/28 |
| 6,038,317 | A * | 3/2000 | Magliveras et al. | 380/28 |
| 6,182,216 | B1 * | 1/2001 | Luyster | 713/168 |
| 6,243,470 | B1 * | 6/2001 | Coppersmith et al. | 380/259 |
| 6,266,417 | B1 * | 7/2001 | Scheidt et al. | 380/255 |
| 6,314,186 | B1 * | 11/2001 | Lee et al. | 380/28 |
| 6,334,197 | B1 * | 12/2001 | Eroz et al. | 714/701 |
| 6,510,538 | B1 * | 1/2003 | Jakobsen | 714/796 |
| 2001/0019610 | A1 * | 9/2001 | Shimoyama | 380/29 |

OTHER PUBLICATIONS

Heys, H. M. ; Travares, S. E., The Design of Secure Block Ciphers, Communications-17th Biennial symposium on communications, 1994; vol. 17 P.: 417-422.*
Youssef, A.M Chen, Z.G., Tavares S.E. Construction of highly nonlinear injective S-boxes with application to CAST -like encryption algorithms, Electrical and Computer Engineering, 1997, IEEE 1997 Canadian Conference vol. 1, pp. 330-333.*
Eli Biham et al, "How to Strengthen DES Using Existing Hardware", Advances in Cryptology- Asiacrypt '94, 4$^{th}$ International Conference on the Theory and Applications of Cryptology, Wollongong, Australia, Nov. 28-Dec. 1, 1994, Proceedings of the Conference on the Theory and Applications of Cryptology, vol. Conf. 4, Nov. 28, 1994, pp. 398-412, XP000527605.

* cited by examiner

Primary Examiner—Christopher Revak
Assistant Examiner—Eleni Shiferaw
(74) Attorney, Agent, or Firm—Larry Liberchuk

(57) ABSTRACT

An input data block is cryptographically converted into an output data block; by performing a non-linear operation on the input data block using an S-box based on permutations. The S-box is associated with a set of at least two permutations. Each time before the S-box is used, one of the permutations is (pseudo-)randomly selected from the set of permutations and used for the conversion.

18 Claims, 2 Drawing Sheets

SUBSTITUTION-BOX FOR SYMMETRIC-KEY CIPHERS

The invention relates to cryptographically converting an input data block into an output data block using a non-linear operation in the form of a Substitution-box (S-box) based on a set of permutations.

The application of cryptography in the area of copyright protection of digital audio and/or video is becoming increasingly important. These applications include contents encryption/decryption and access management functions. For such applications the well-known block cipher DES can be used. DES is a Feistel cipher consisting of sixteen rounds. In each round, first the 32 bits of the right half of the data are expanded to 48 bits. Next, an 48 bit round key, which is computed from a 56 bit DES key with a scheduling algorithm, is bit-wise added modulo two to these 48 bits. Then a layer of S-boxes performs a non-linear operation on the data. In DES, the S-box layer consist of eight six-to-four bit S-boxes in parallel, i.e. each of the S-boxes converts a 6-bit input block into a 4-bit output block using one fixed mapping table per S-box. The output of the S-box layer is a 32 bit data block on which a bit-permutation is performed. The S-box substitution is the only non-linear operation in DES and contributes highly to its security. A drawback of DES is its small key size of 56 bits, which is considered to be insufficient nowadays for offering a high level of security. However, an exhaustive key search can be avoided by using a longer key combined with a different key scheduling algorithm for computing the sixteen 48-bit round keys. The two most powerful attacks on DES published in the open literature are differential and linear cryptoanalysis, which are general attacks that can be applied to a wide range of block ciphers. It has been shown that DES can not be strengthened much against these attacks by modifying the key length and/or the key scheduling algorithm. However, changes in the round function of the algorithm (e.g. in the S-boxes) can influence its strength against these attacks considerably.

It is an object to design S-boxes with good cryptographic characteristics. It is a further object that such S-boxes can be efficiently implemented in hardware and software allowing a broad use in consumer electronic applications.

To meet the object of the invention, the permutation for the S-box is dynamically selected from a predetermined set of permutations. Preferably, each permutation in the set is chosen to provide optimal resistance against known attacks, in particular differential and linear cryptoanalysis. By choosing the permutations (pseudo-)randomly the system can be made cryptographically stronger than a system in which each S-box consists of only one fixed permutation. Selection of a permutation from a set can be executed fast and cost-effectively.

As defined in the measure of the dependent claim 2, and further elaborated in the dependent claims 3 and 6, a cryptographic weakness in one of the permutations is compensated by a corresponding strength in at least one of the other permutations of the set. The weakness may, for instance, be reflected in a non-trivial differential and/or linear characteristic having a predetermined maximum probability. An advantage of this approach is that an adversary can not base a differential or linear attack on these characteristics without making assumptions on the unknown (round) key(s).

As defined in the measure of the dependent claim 4, the weakness is fully compensated.

As defined in the measure of the dependent claim 10, the selection of the permutation is preferably performed under control of a round key. The algorithm generating the round keys (i.e. the key scheduling algorithm) can be chosen to obtain a desired degree of pseudo-randomness. An advantage for using round keys for the selection is that the permutation is selected from the set during the computation of the round keys. For efficiency reasons, this is usually and preferably done once for each key and all data that has to be processed (e.g. encrypted) with this key. In this way the encryption/decryption algorithm can be as efficient as a system based on S-boxes consisting of only one fixed permutation for each S-box.

These and other aspects of the invention will be apparent from and elucidated with reference to the embodiments shown in the drawings.

Figure 3:
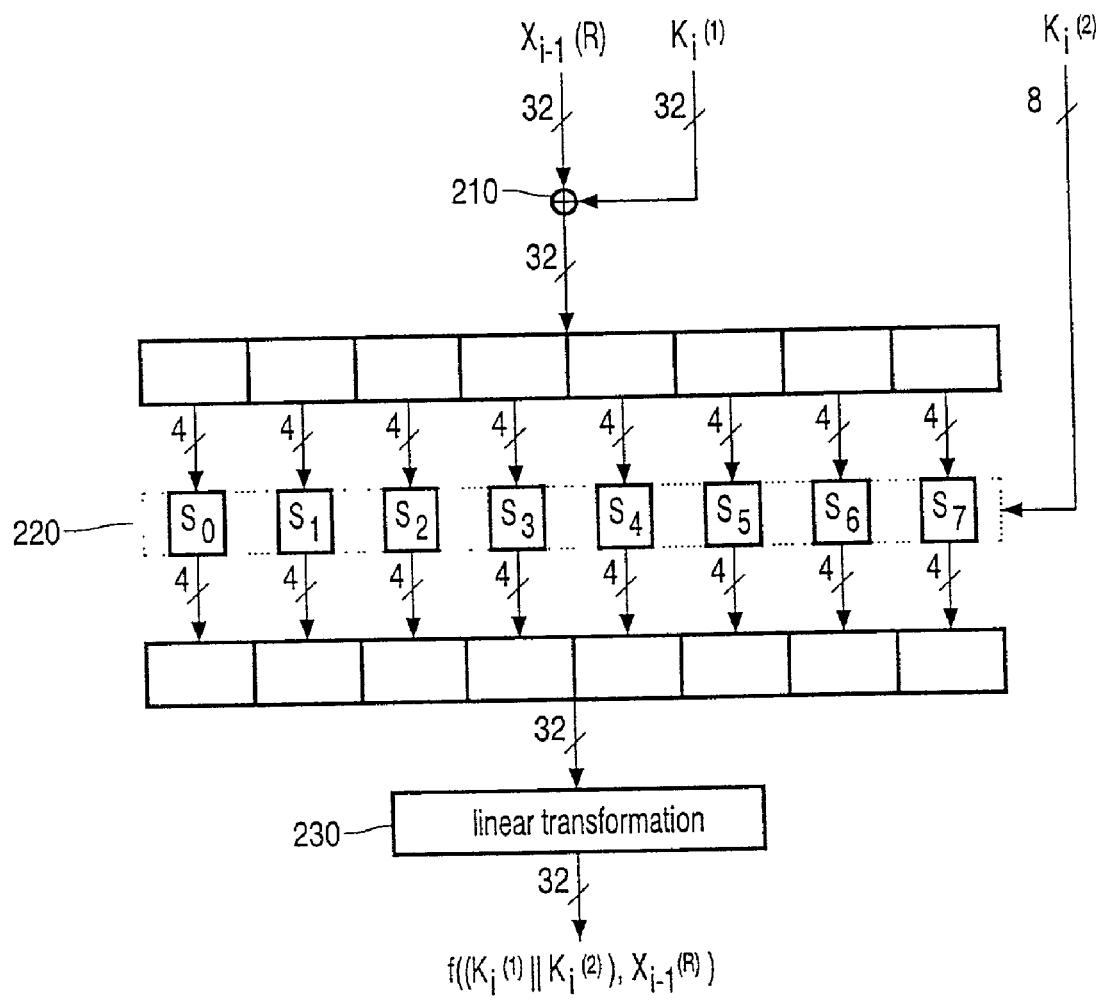

FIG. 3 provides details of the S-box layer of the round function.

For the purpose of explaining the invention, the cryptographic system is described as a block cipher in the Electronic Codebook (ECB) mode. Persons skilled in the art will be able to use the system in other modes as well. These include the standard FIPS modes of operation for DES, i.e. the Cipher Block Chaining (CBC), the Cipher Feedback (CFB) and the Output Feedback (OFB) mode of operation. In addition, the system can also be used in well-known constructions for pseudo-random number generators, Message Authentication Codes (MACs) and Manipulation Detection Codes (MDCs).

The cryptographic apparatus comprises an input for obtaining a digital input block. The digital input block M may be any suitable size. The apparatus further comprises a cryptographic processor for converting the digital input block into a digital output block. Advantageously, the digital output block has substantially equal length as the digital input block. The apparatus comprises an output for outputting the digital output block. In a preferred embodiment, the cryptographic processor converts the digital input block into the digital output block by merging the digital input block with key bits, producing the output block which non-linearly depends on the input block and the key. To obtain the key (or an initial key feeding a key scheduler), the cryptographic apparatus comprises a second input. It will be appreciated that the cryptographic apparatus may be implemented using a conventional computer, such as a PC, or using a dedicated encryption/decryption device. The digital input block may be obtained in various ways, such as via a communication network, from a data storage medium, such as a harddisk or floppy disk, or directly being entered by a user. Similarly, the digital output block may be output in various ways, such as via a communication network, stored on a data storage medium, or displayed to a user. Preferably, secure means are used to this end. The cryptographic processor may be a conventional processor, such as for instance used in personal computers, but may also be a dedicated cryptographic processor. The processor is usually operated under control of a suitable program (firmware) to perform the steps of the algorithm according to the invention. This computer program product is normally loaded from a background storage, such as a harddisk or ROM. The computer program product can be stored on the background storage after having been distributed on a storage medium, like a CD-ROM, or via a network, like the public Internet. Sensitive information, like an encryption key, is preferably distributed and stored in a secure way. Techniques for doing so are generally known and not described further. The cryptographic apparatus may, in part or in whole, be implemented on a smart-card.

The non-linear operation of the S-box according to the invention performed by the cryptographic processor will be described in the form of a round function $f$ in a block cipher as an exemplary application. In itself persons skilled in the art will be able to use the non-linear function in other cryptographic systems as well, and in other ciphers than the one described in detail below.

Notations and definitions:

The following notation is used in the description of the exemplary algorithm. Let $Z_2^n$ be the set of all binary vectors of length n ($n \geq 1$) with the addition $\oplus$: $Z_2^n \times Z_2^n \to Z_2^n$, which is defined as a coordinate-wise addition modulo 2 (also referred to as an exclusive-or, or XOR). For example, $(1,0,1,0)$ and $(0,1,1,0)$ are elements of $Z_2^4$ and $(1,0,1,0) \oplus (0,1,1,0) = (1,1,0,0)$. If n is even and $x \in Z_2^n$, then $x^{(L)} \in Z_2^{n/2}$ and $x^{(R)} \in Z_2^{n/2}$ are defined as the left and the right half of x respectively. For example, if $x = (1,0,1,1,0,0,1,0) \in Z_2^8$, then $x^{(L)} = (1,0,1,1) \in Z_2^4$ and $x^{(R)} = (0,0,1,0) \in Z_2^4$. The symbol $\|$ is used to denote a concatenation of vectors, e.g. $x = (x^{(L)} \| x^{(R)})$. The elements (also called bits) of a vector $x \in Z_2^n$ are numbered from zero to n−1 from the left to the right, i.e. $x =: (x_0, x_1, x_2, \ldots, x_{n-1})$. The inproduct $\cdot$: $Z_2^n \times Z_2^n \to Z_2$ is defined as $x \cdot y = \Sigma_{i=0,1,\ldots,n-1} x_i y_i \in Z_2$ for all $x, y \in Z_2^n$.

Block cipher structure:

The exemplary block cipher is a Feistel cipher and consists of sixteen rounds (like DES). The block length equals 64 bits and the key length equals 128 bits. Encryption in Electronic Codebook (ECB) mode of a plain text $X \in Z_2^{64}$ into its cipher text $C \in Z_2^{64}$ under the key $K \in Z_2^{128}$ is denoted by $C = E(K,X)$.

The round function is denoted by $f$ and is a mapping from $Z_2^{40} \times Z_2^{32}$ to $Z_2^{32}$. This round function incorporates the non-linear S-box operation of the invention and will be described in more detail below. The first input argument of the round function is the round key $K_i \in Z_2^{40}$ (where i indicates the round number, $i=1, 2, \ldots, 16$). These round keys are computed from the 128 bit key K with a so-called key scheduling algorithm. Any suitable key scheduling algorithm may be used and is not described in detail. The second input argument is the right half of the intermediate result after round i. This intermediate result is denoted by $X_i \in Z_2^{64}$ ($i=0,1, \ldots, 16$) with $X =: (X_0^{(R)} \| X_0^{(L)})$.

With this notation the computation of the cipher text $C \in Z_2^{64}$ consists of the following steps, as illustrated in FIG. 1:

1. Compute $X_i^{(R)} = X_{i-1}^{(L)} \oplus f(K_1, X_{i-1}^{(R)})$ and set $X_1^{(L)} = X_{i-1}^{(R)}$ for $i=1,2, \ldots, 15$.

Figure 1A:
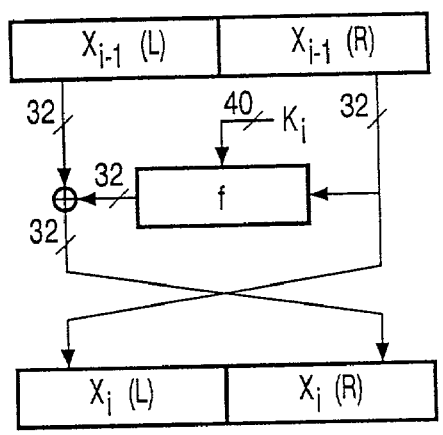
FIG. 1 shows one round of a cipher incorporating the non-linear operation.
Figure 1B:
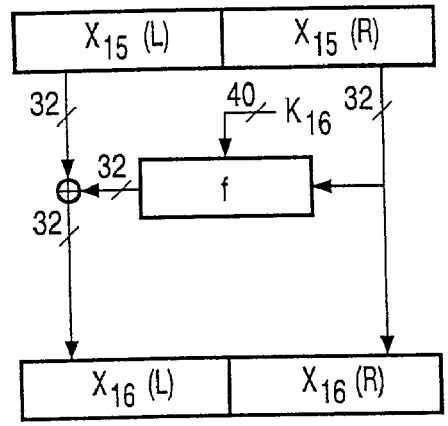

2. Compute $X_{16}^{(L)} = X_{15}^{(L)} \oplus f(K_{16}, X_{15}^{(R)})$ and set $X_{16}^{(R)} = X_{15}^{(R)}$. The cipher text is defined as $C := (X_{16}^{(L)} \| X_{16}^{(R)})$ FIG. 1A shows the cipher structure used for the first fifteen rounds ($i=1, 2, \ldots, 15$). FIG. 1B shows the last, sixteenth round. Note the irregular swap in FIG. 1B compared to the previous rounds of FIG. 1A. This is usually done in Feistel structures, because in this case the decryption algorithm (i.e. computing $X = E^{-1}(K,C)$) is the same as the encryption algorithm (with the round keys in reverse order). It has no meaning in a cryptographic sense.

Figure 2:
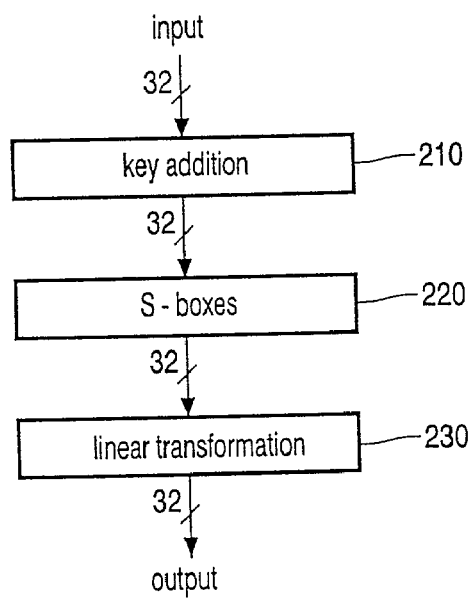
FIG. 2 illustrates the steps of the round function.

Round function:

FIG. 2 shows an overall block diagram of a preferred embodiment of the round functions $f$. First a part of the round key, of for instance 32 bits, is added to the data bits in step 210. Next, in step 220, the S-boxes perform a non-linear substitution, preferably providing an optimal (local) resistance against differential and linear cryptanalysis. In addition, preferably the non-trivial (local) characteristics with a predetermined maximum probability are made (round) key dependent, as described below in more detail. Finally, in step 230 a linear transformation is used to provide a high diffusion over multiple rounds. Any suitable linear transformation may be used. The linear transformation is not the subject of the present invention and will not be described in detail.

The Feistel structure puts no restrictions on the surjectivity of the round function. However, preferably the round function is bijective for every choice for the fixed (round) key. This avoids attacks based on the non-uniformity of the round function.

FIG. 3 provides more details of a preferred arrangement incorporating the S-box according to the invention. In this exemplary system the round function $f$ is a mapping from $Z_2^{40} \times Z_2^{32}$ to $Z_2^{32}$. The first input argument is the round key $K_i \in Z_2^{40}$, the second one the right half of the intermediate result $X_{i-1}$. The output is denoted by $f(K_i, X_{i-1}^{(R)}) \in Z_2^{32}$. In this figure, $K_i^{(1)} \in Z_2^{32}$ and $K_i^{(2)} \in Z_2^8$ are defined as $K_i =: (K_i^{(1)} \| K_i^{(2)})$. In step 210, the key addition takes place, followed in step 220 by a key dependent Substitution box (S-box) layer is used. In this example, the S-box layer consists of eight smaller S-boxes ($S_0, S_1, S_2, \ldots, S_7$), each operating on ⅛ of the data block. The S-box transformation is a mapping from $Z_2^8 \times Z_2^{32}$ to $Z_2^{32}$, the first input argument in round i is the round key $K_i^{(2)}$, the second one the result of the key addition, i.e. $X_{i-1}^{(R)} \oplus K_i^{(1)}$. The 32 bit output of the S-box transformation is denoted by $S(K_i^{(2)}, X_{i-1}^{(R)} \oplus K_i^{(1)})$. A detailed description of this mapping will be given below. Finally, in step 230 a suitable linear transformation from $Z_2^{32}$ to $Z_2^{32}$ is applied. The input is $S(K_i^{(2)}, X_{i-1}^{(R)} \oplus K_i^{(1)})$, its output is denoted by $L(S(K_i^{(2)}, X_{i-1}^{(R)} \oplus K_i^{(1)}))$. With this notation the function $f$ is given by:

$$f(K_i, X_{i-1}^{(R)}) = L(S(K_i^{(2)}, X_{i-1}^{(R)} \oplus K_i^{(1)})).$$

S-boxes:

According to the invention, an S-box performs a substitution of the data. In a preferred embodiment described here, the S-box operates on a 4-bit sub-block. It will be appreciated that also sub-blocks of other sizes can be used. According to the invention, for each S-box a set of at least two predetermined permutations is used, where each time before using the S-box one of these permutations is selected in a (pseudo-)random manner. Preferably, the round key is used for this selection. In a preferred embodiment, each S-box is associated with two permutations, where one predetermined bit of the round key is used to select which of both permutations is used. Using relatively small S-boxes, such as ones operating on 4-bit sub-blocks, will normally require a row of parallel S-boxes, each being associated with a respective set of at least two non-linear permutations. In a preferred embodiment of a block cipher operating on 32-bit blocks and using 4-bit S-boxes, eight S-boxes are used in parallel, each of which consists of two permutations. For this embodiment the following notation is used. Let the bits in the first input argument $K_i^{(2)}$ of the S-box transformation be denoted by $k_j^{(i)}$ ($j=0,1, \ldots 7$), i.e. $K_i^{(2)} =: (k_0^{(i)}, k_1^{(i)}, \ldots, k_7^{(i)})$. The vectors $N_j^{(i)} \in Z_2^4$ ($j=0,1, \ldots, 7$) are defined as $X_{i-1}^{(R)} \oplus K_i^{(1)} =: (N_0^{(i)} \| N_1^{(i)} \| \ldots \| N_7^{(i)})$. The S-box mapping consists of a concatenation of eight mappings $S_j$: $Z^2 \times Z_2^4 \to Z_2^4$ ($j=0,1, \ldots, 7$). The first input argument is the key bit $k_j^{(i)}$, which selects which of the two permutations for $S_j$ is used. The second input argument is $N_j^{(i)}$, which is the input for the selected 4-bit permutation for $S_j$. The corresponding 4-bit output of this permutation is also the output of the S-box, and is denoted by $S_j(k_j^{(i)}, N_j^{(i)})$. With this notation the function S is given by:

$$S(K_i^{(2)}, X_{i-1}^{(R)} \oplus K_1^{(i)}) = (S_0(k_0^{(i)}, N_0^{(i)}) \| S_1(k_1^{(i)}, N_1^{(i)}) \| \ldots \| S_7(k_7^{(i)}, N_7^{(i)})).$$

Differential and linear characteristics of a permutation:

The following design criteria are preferably used for the individual permutations:

1. Resistance against differential cryptoanalysis: the maximum non-trivial value in the XOR distribution table equals a predetermined maximum. Assuming 4-bit permutations this maximum is 4, i.e. each non-trivial differential characteristic has a probability of at most ¼. The concept of differential characteristic and XOR distribution table is generally known. It has been described publicly for the first time in 1990 by Biham and Shamir, for instance in "Differential Cryptoanalysis of DES-Like Cryptosystems", Journal of Cryptology, Volume 4 (1), 1991, pp 3–72.

2. Resistance against linear cryptoanalysis: the maximum non-trivial absolute value in the linear approximation table equals a predetermined maximum. Assuming 4-bit permutations, this maximum is 4, i.e. each non-trivial linear characteristic has a probability between ¼ and ¾. The concept of linear characteristic and linear approximation table is generally known. It has been described publicly for the first time by Matsui. A description is given in E. Biham, "On Matsui's Linear Cryptoanalysis", EUROCRYPT'94, LNCS 950, Springer, 1995, pp. 341–355.

Preferably each permutation meets both of these requirements. Above criteria are described in detail for 4-bit non-linear permutations. It can be proven that these criteria are optimal for 4-bit permutations, i.e. there exists no 4-bit permutation with a maximal non-trivial XOR distribution table value smaller than 4, and there exist no 4-bit permutation with a maximal non-trivial absolute value in its linear approximation table that is smaller than 4.

Permutations meeting above criteria can be created by randomly generating a permutation and testing whether the generated permutation meets the criteria. Also other suitable techniques may be used, like exhaustive search until a suitable permutation is found or using (mathematical) construction methods. One particular example of a construction method is based on the inversion mapping in the finite field with $2^n$ elements, with zero mapped to itself, and can be found in K. Nyberg, "Differentially uniform mappings for cryptography", EUROCRYPT'93, LNCS 765, Springer, 1994, pp. 55–64. The corresponding criteria satisfied by the n-bit S-boxes constructed according to this method, with n even, are given by:

1. Resistance against differential cryptoanalysis: the maximum non-trivial value in the XOR distribution table equals 4, i.e. each non-trivial differential characteristic has a probability of at most $4/2^n$.

2. Resistance against linear cryptoanalysis: the maximum non-trivial absolute value in the linear approximation table equals $2^{n/2}$, i.e. each non-trivial linear characteristic has a probability between $½-½^{n/2}$ and $½+½^{n/2}$.

It is easily seen that these criteria generalize the ones given above for 4-bit permutations. It is well-known that applying any invertible affine mapping (over $Z_2^n$) on all input elements and/or on all the output elements of an n-bit S-box does not affect its maximum non-trivial XOR value or its maximum non-trivial absolute value in its linear approximation table. In this way a number of S-boxes satisfying above criteria can be constructed from a single S-box.

According to the invention an S-box is associated with at least two non-linear permutations. The permutations in the set have been selected such that they compensate each other's weaknesses. This will be described in more detail for the differential and linear characteristics respectively. The additional criteria will be illustrated using an S-box, e.g. So with the following two permutations:

|         |   | $N_0^{(i)}$ |   |   |   |   |   |   |   |   |   |   |   |   |   |   |
|---------|---|---|---|---|---|---|---|---|---|---|---|---|---|---|---|---|
| $k_0^{(i)}$ | 0 | 1 | 2 | 3 | 4 | 5 | 6 | 7 | 8 | 9 | a | b | c | d | e | f |
| 0 | b | 7 | 5 | 9 | 1 | 8 | 3 | e | 4 | d | 0 | a | f | c | 2 | 6 |
| 1 | 7 | 0 | 8 | f | 9 | b | a | c | 1 | 3 | 4 | 5 | e | 6 | 2 | d |

The rows 0 and 1 represent the output of the two permutations, corresponding to the input defined by the column number. In the following, these two permutations will be denoted by $P_0$ and $P_1$ respectively. Both input and output are given in hexadecimal notation. For instance, if the first permutation is selected (i.e. $k_0^{(i)}=0$), and $N_0^{(i)}=3$ then the output equals 9, i.e. $S_0(0,3)=9$. Similarly, $S_0(1,3)=f$. Assuming eight parallel S-boxes, each associated with two permutations specific for that box, a total of 16 different permutations need to be generated. Preferably, each of those permutations meets all criteria given above. According to the invention, the permutations belonging to one S-box, as a set, also meet at least one, and preferably, both of the criteria given below.

Differential characteristics of a set of permutations:

A set of permutations for one S-box satisfies the following criterion:

If a non-trivial differential characteristic in one of the permutations has maximum probability, then this differential characteristic has a lower probability in at least one of the other permutations.

It will be appreciated that in this way the weakness in one of the permutations is compensated by a strength in one of the other permutations. Preferably, the lower probability is zero, optimally compensating a weakness. The preferred criterion, therefore, for a pair of 4-bit permutations for one S-box is: if a non-trivial differential characteristic in one of the two permutations has probability ¼, then this differential characteristic has probability 0 in the other permutation, i.e. each non-trivial (round)key-independent differential characteristic of an S-box has a probability of at most ⅛.

To illustrate that the two described permutations $P_0$ and $P_1$ meet this criterion, their XOR distribution tables are given below. The entry in row $\alpha$ and column $\beta$ in the XOR distribution table of $P_i$ (with $\alpha, \beta \in Z_2^4$) is denoted by $X_i^{\alpha,\beta}$ and is defined as:

$$X_i^{\alpha,\beta} := \#\{x \in Z_2^4 | P_i(x) \in P_i(x \in \alpha) = \beta\}, i=0,1.$$

I.e. $X_i^{\alpha,\beta}$ equals the number of input pairs with difference $\alpha$ that causes a difference $\beta$ in the corresponding output pair for the permutation $P_i$.

XOR distribution table of $P_0$

| | | | | | | | | β | | | | | | | | |
|---|---|---|---|---|---|---|---|---|---|---|---|---|---|---|---|---|
| α | 0 | 1 | 2 | 3 | 4 | 5 | 6 | 7 | 8 | 9 | a | b | c | d | e | f |
| 0 | 16 | 0 | 0 | 0 | 0 | 0 | 0 | 0 | 0 | 0 | 0 | 0 | 0 | 0 | 0 | 0 |
| 1 | 0 | 0 | 0 | 2 | 2 | 0 | 0 | 0 | 0 | 4 | 2 | 0 | 4 | 2 | 0 | 0 |
| 2 | 0 | 0 | 2 | 0 | 2 | 0 | 2 | 2 | 0 | 0 | 2 | 0 | 0 | 2 | 4 | 0 |
| 3 | 0 | 0 | 4 | 0 | 0 | 0 | 0 | 0 | 0 | 2 | 0 | 2 | 0 | 2 | 4 | 2 |
| 4 | 0 | 2 | 2 | 0 | 0 | 0 | 2 | 2 | 0 | 0 | 2 | 2 | 2 | 0 | 0 | 2 |
| 5 | 0 | 0 | 2 | 2 | 0 | 0 | 4 | 0 | 4 | 0 | 2 | 2 | 0 | 0 | 0 | 0 |
| 6 | 0 | 2 | 0 | 0 | 2 | 0 | 4 | 0 | 2 | 2 | 0 | 2 | 0 | 0 | 0 | 2 |
| 7 | 0 | 0 | 2 | 0 | 2 | 4 | 0 | 0 | 2 | 0 | 0 | 0 | 2 | 2 | 0 | 2 |
| 8 | 0 | 2 | 0 | 2 | 2 | 2 | 0 | 0 | 2 | 0 | 2 | 0 | 0 | 0 | 2 | 2 |
| 9 | 0 | 0 | 0 | 2 | 0 | 2 | 2 | 2 | 0 | 2 | 0 | 0 | 2 | 2 | 0 | 2 |
| a | 0 | 2 | 2 | 2 | 2 | 0 | 0 | 0 | 0 | 0 | 2 | 2 | 2 | 2 | 0 | 0 |
| b | 0 | 4 | 0 | 0 | 0 | 0 | 0 | 4 | 2 | 0 | 2 | 0 | 0 | 2 | 0 | 2 |
| c | 0 | 0 | 0 | 2 | 4 | 4 | 0 | 2 | 0 | 0 | 0 | 2 | 0 | 0 | 0 | 2 |
| d | 0 | 0 | 0 | 2 | 0 | 0 | 0 | 2 | 2 | 2 | 0 | 2 | 4 | 0 | 2 | 0 |
| e | 0 | 4 | 2 | 2 | 0 | 2 | 0 | 2 | 0 | 2 | 2 | 0 | 0 | 0 | 0 | 0 |
| f | 0 | 0 | 0 | 0 | 0 | 2 | 2 | 0 | 2 | 2 | 2 | 2 | 0 | 2 | 2 | 0 |

The probability for a given (local) differential characteristic, i.e. the probability that an input difference $\alpha$ causes an output difference $\beta$ (denoted by $\alpha \to \beta$), can be found by dividing the corresponding entry by the total number of input pairs with the given input difference. This total number of input pairs equals sixteen for 4-bit permutations, so the probability that $\alpha \to \beta$ is given by $X_i^{\alpha,\beta}/16$. Note that the entries in the first row and column of these tables represent the trivial characteristic, i.e. $0 \to 0$ with probability one, which always holds for permutations. It is easily seen that all other (non-trivial) differential characteristics have probability smaller or equal to $\frac{1}{4}$, since the maximum value over all other entries equals 4 for both permutations.

XOR distribution table of $P_1$

| | | | | | | | | β | | | | | | | | |
|---|---|---|---|---|---|---|---|---|---|---|---|---|---|---|---|---|
| | 0 | 1 | 2 | 3 | 4 | 5 | 6 | 7 | 8 | 9 | a | b | c | d | e | f |
| 0 | 16 | 0 | 0 | 0 | 0 | 0 | 0 | 0 | 0 | 0 | 0 | 0 | 0 | 0 | 0 | 0 |
| 1 | 0 | 2 | 4 | 0 | 0 | 0 | 2 | 4 | 2 | 0 | 0 | 0 | 0 | 0 | 0 | 2 |
| 2 | 0 | 0 | 0 | 2 | 0 | 2 | 2 | 2 | 0 | 0 | 0 | 2 | 2 | 0 | 0 | 4 |
| 3 | 0 | 2 | 0 | 2 | 4 | 2 | 0 | 2 | 4 | 0 | 0 | 0 | 0 | 0 | 0 | 0 |
| 4 | 0 | 0 | 2 | 2 | 0 | 2 | 2 | 0 | 2 | 0 | 2 | 0 | 0 | 2 | 0 | 2 |
| 5 | 0 | 0 | 0 | 0 | 2 | 2 | 0 | 4 | 0 | 4 | 0 | 2 | 2 | 0 | 0 | 0 |
| 6 | 0 | 2 | 0 | 4 | 2 | 0 | 0 | 0 | 0 | 2 | 0 | 2 | 2 | 2 | 0 | 0 |
| 7 | 0 | 2 | 2 | 2 | 0 | 0 | 2 | 0 | 0 | 0 | 2 | 4 | 2 | 0 | 0 | 0 |
| 8 | 0 | 2 | 0 | 2 | 0 | 0 | 2 | 2 | 2 | 0 | 2 | 0 | 2 | 2 | 0 | 0 |
| 9 | 0 | 2 | 0 | 0 | 2 | 2 | 0 | 2 | 0 | 0 | 0 | 2 | 0 | 2 | 2 | 2 |
| a | 0 | 0 | 0 | 2 | 2 | 2 | 2 | 0 | 0 | 2 | 2 | 2 | 2 | 0 | 0 | 0 |
| b | 0 | 0 | 4 | 0 | 4 | 0 | 0 | 0 | 0 | 2 | 0 | 2 | 2 | 0 | 2 | 0 |
| c | 0 | 0 | 2 | 0 | 0 | 0 | 2 | 0 | 4 | 4 | 2 | 0 | 0 | 0 | 2 | 0 |
| d | 0 | 2 | 0 | 0 | 0 | 0 | 2 | 0 | 2 | 0 | 4 | 0 | 0 | 2 | 2 | 2 |
| e | 0 | 0 | 0 | 0 | 0 | 2 | 2 | 0 | 0 | 2 | 0 | 2 | 0 | 4 | 2 | 2 |
| f | 0 | 2 | 2 | 0 | 0 | 0 | 0 | 0 | 0 | 2 | 0 | 2 | 2 | 2 | 2 | 2 |

The compensation effect can, for instance, be seen by considering the characteristic $7 \to 5$ for both permutations. For $P_0$ the probability that $7 \to 5$ equals $X_0^{7,5}/16 = \frac{1}{4}$, for $P_1$ this probability is given by $X_1^{7,5}/16 = 0$. Preferably this compensation occurs for as many as possible elements. In the example, this holds for all elements with the maximum XOR difference value of four. Using well-known techniques for generating and testing permutations, a person skilled in the art can create eight such pairs of permutations within a few days for 4-bit permutations. Alternatively, a different pair of permutations $P_0^*$ and $P_1^*$ satisfying the criteria can be constructed from $P_0$ and $P_1$ by e.g. applying an affine transformation on the output of both of these permutations. This cane be done by selecting a non-singular 4×4 matrix A over $Z_2$ and a vector $b \in Z_2^4$ and defining $P_0^*(x) := P_0(x)A \oplus b$ and $P_1^*(x) := P_1(x)A \oplus b$ for all $x \in Z_2^4$. It can be easily verified that in this way 322560 different (ordered) pairs of permutations can be constructed, each of which satisfies all above criteria. Note that one of these transformations is the identity mapping from $Z_2^4 \to Z_2^4$, i.e. $P_0^* = P_0$ and $P_1^* = P_1$.

Linear characteristics of a set of permutations:

A set of permutations for one S-box satisfies the following criterion:

If a non-trivial linear characteristic in one of the permutations has a probability with a maximal absolute difference from $\frac{1}{2}$, then this linear characteristic has a probability that is closer to $\frac{1}{2}$ in at least one of the other permutations.

It will be appreciated that in this way the weakness in one of the permutations is compensated by a strength in one of the other permutations. Preferably, the corresponding probability in one of the other permutations equals ½, optimally compensating a weakness. The preferred criterion, therefore, for a pair of 4-bit permutations for one S-box is: if a linear characteristic in one of the two permutations has probability ¼ or ¾, then this linear characteristic has probability ½ in the other permutation, i.e. each (round) key-independent linear characteristic of an S-box has a probability between ⅜ and ⅝.

To illustrate that the two described permutations $P_0$ and $P_1$ meet this criterion, their linear approximation tables are given below. The entry in row $\alpha$ and column $\beta$ in the linear approximation table of $P_i$ (with $\alpha,\beta \in Z_2^4$) is denoted by $L_i^{\alpha,\beta}$ and is defined as:

$$L_i^{\alpha,\beta} := \#\{x \in Z_2^4 | x \cdot \alpha = P_i(x) \cdot \beta\} - 8, \quad i=0,1.$$

I.e. for the permutation $P_i$, $L_1^{\alpha,\beta}$ represents the number of inputs for which the linear relation on the input bits defined by $\alpha$ equals the linear relation on the corresponding output bits defined by $\beta$ minus 8, which is the ideal number for 4-bit permutations (more generally, the ideal value is $2^{n-1}$ for n-bit permutations).

Linear approximation table of $P_0$

| | | | | | | | | β | | | | | | | | |
|---|---|---|---|---|---|---|---|---|---|---|---|---|---|---|---|---|
| α | 0 | 1 | 2 | 3 | 4 | 5 | 6 | 7 | 8 | 9 | a | b | c | d | e | f |
| 0 | 8 | 0 | 0 | 0 | 0 | 0 | 0 | 0 | 0 | 0 | 0 | 0 | 0 | 0 | 0 | 0 |
| 1 | 0 | -2 | 0 | 2 | 2 | 0 | 2 | 0 | 4 | 2 | 4 | 2 | 2 | 0 | -2 | 0 |
| 2 | 0 | -2 | 2 | 4 | -2 | 0 | 0 | -2 | -2 | 0 | 0 | -2 | 0 | -2 | 2 | -4 |
| 3 | 0 | 0 | -2 | -2 | 0 | -4 | 2 | -2 | -2 | 2 | 4 | 0 | -2 | -2 | 0 | 0 |
| 4 | 0 | -2 | 2 | 0 | 0 | 2 | -2 | 0 | 0 | 2 | 2 | 4 | -4 | 2 | 2 | 0 |
| 5 | 0 | 4 | 2 | 2 | -2 | -2 | 0 | 4 | 0 | 0 | 2 | -2 | -2 | 2 | 0 | 0 |
| 6 | 0 | 0 | -4 | 0 | -2 | -2 | -2 | 2 | 2 | 2 | -2 | 2 | 0 | 0 | 0 | -4 |
| 7 | 0 | 2 | 0 | 2 | 4 | -2 | -4 | -2 | -2 | 0 | -2 | 0 | -2 | 0 | -2 | 0 |
| 8 | 0 | -4 | 0 | 0 | 2 | -2 | 2 | 2 | 0 | -4 | 0 | 0 | -2 | 2 | -2 | -2 |
| 9 | 0 | -2 | 0 | -2 | 0 | -2 | -4 | 2 | 0 | -2 | 0 | -2 | 0 | -2 | 4 | 2 |
| A | 0 | 2 | -2 | 0 | 4 | 2 | 2 | 0 | 2 | 0 | 0 | -2 | -2 | 0 | 4 | -2 |
| B | 0 | 0 | 2 | -2 | 2 | -2 | 0 | 0 | -2 | 2 | 0 | 0 | 4 | 4 | 2 | -2 |
| C | 0 | -2 | -2 | 0 | -2 | 0 | 0 | -2 | 0 | 2 | -2 | -4 | -2 | 4 | 0 | 2 |
| D | 0 | 0 | -2 | -2 | 0 | 4 | -2 | 2 | -4 | 0 | 2 | -2 | 0 | 0 | -2 | -2 |
| E | 0 | 0 | -4 | 4 | 0 | 0 | 0 | 0 | -2 | -2 | 2 | 2 | 2 | 2 | 2 | 2 |
| F | 0 | -2 | 0 | 2 | 2 | 0 | 2 | 4 | -2 | 4 | -2 | 0 | 0 | -2 | 0 | 2 |

The probability for a given (local) linear characteristic, i.e. the probability that the linear relation on the input bits defined by a equals the linear relation on the output bits defined by $\beta$ (denoted by $\alpha \to \beta$), equals $½ + L_i^{\alpha,\beta}/16$. Note that the entries in the first row and column of these tables represent the trivial characteristic, i.e. $0 \to 0$ with probability one, which holds for any mapping. It is easily seen that all other (non-trivial) differential characteristics have probability between ¼ and ¾, since the minimum and maximum value over all other entries equal minus four and four respectively for both permutations.

Linear approximation table of $P_1$

| | | | | | | | | β | | | | | | | | |
|---|---|---|---|---|---|---|---|---|---|---|---|---|---|---|---|---|
| α | 0 | 1 | 2 | 3 | 4 | 5 | 6 | 7 | 8 | 9 | a | b | c | d | e | f |
| 0 | 8 | 0 | 0 | 0 | 0 | 0 | 0 | 0 | 0 | 0 | 0 | 0 | 0 | 0 | 0 | 0 |
| 1 | 0 | 2 | 0 | -2 | 2 | 0 | 2 | -4 | 0 | -2 | 0 | 2 | -2 | 0 | -2 | -4 |
| 2 | 0 | -2 | -2 | 0 | 2 | -4 | 4 | 2 | 2 | 0 | 0 | 2 | 0 | 2 | 2 | 0 |
| 3 | 0 | -4 | 2 | -2 | -4 | 0 | 2 | -2 | -2 | -2 | 0 | 0 | 2 | 2 | 0 | 0 |
| 4 | 0 | -2 | 2 | 4 | 0 | 2 | 2 | 0 | 4 | -2 | 2 | 0 | 0 | -2 | -2 | 0 |
| 5 | 0 | 0 | 2 | 2 | -2 | -2 | 0 | 0 | 0 | 0 | -2 | -2 | -2 | -2 | 4 | -4 |
| 6 | 0 | 0 | 0 | 0 | 2 | 2 | -2 | -2 | 2 | -2 | -2 | 2 | 4 | 0 | 4 | 0 |
| 7 | 0 | -2 | -4 | -2 | 0 | 2 | 0 | -2 | 2 | 0 | 2 | -4 | -2 | 0 | 2 | 0 |
| 8 | 0 | 0 | 0 | 4 | 2 | 2 | 2 | -2 | -4 | 0 | 0 | 0 | -2 | 2 | 2 | 2 |
| 9 | 0 | -2 | 0 | -2 | 2 | 0 | 2 | 0 | -2 | -4 | 2 | -4 | -2 | 0 | 0 | 2 |
| A | 0 | -2 | 2 | 0 | 0 | 2 | -2 | 0 | 2 | 4 | 0 | 2 | -2 | 4 | 0 | -2 |
| B | 0 | 0 | -2 | 2 | -2 | -2 | 0 | -4 | 2 | 2 | -4 | 0 | 0 | 0 | -2 | 2 |
| C | 0 | 2 | -2 | 0 | -2 | 4 | 4 | 2 | 0 | 2 | -2 | 0 | 2 | 0 | 0 | -2 |
| D | 0 | 0 | -2 | 2 | 0 | 0 | -2 | 2 | 0 | -4 | -2 | -2 | 0 | 4 | -2 | -2 |
| B | 0 | 4 | 0 | 0 | -4 | 0 | 0 | 0 | 2 | -2 | 2 | 2 | -2 | 2 | 2 | 2 |
| F | 0 | -2 | -4 | 2 | -2 | 0 | -2 | 0 | -2 | 0 | 2 | 4 | 0 | -2 | 0 | -2 |

The compensation effect can, for instance, be seen by considering the linear characteristic 2→3 for both permutations. For $P_0$ the probability that 2→3 equals $\frac{1}{2}+L_0^{2,3}/16=\frac{3}{4}$, for $P_1$ this probability is given by $\frac{1}{2}+L_1^{2,3}/16=\frac{1}{2}$. Preferably this compensation occurs for as many as possible elements. In the example, this holds for all elements with the maximum absolute value of four. Using well-known techniques for generating and testing permutations, a person skilled in the art can create eight such pairs of permutations within a few days for 4-bit permutations. Alternatively, a different pair of permutations $P_0^*$ and $P_1^*$ satisfying the criteria can be constructed from $P_0$ and $P_1$ by e.g. applying an affine transformation on the output of both of these permutations. This cane be done by selecting a non-singular 4×4 matrix A over $Z_2$ and a vector b $\epsilon Z_2^4$ and defining $P_0^*(x):=P_0(x)A \oplus b$ and $P_1^*(x):=P_1(x)A \oplus b$ for all $x \epsilon Z_2^4$. It can be easily verified that in this way 322560 different (ordered) pairs of permutations can be constructed, each of which satisfies all above criteria. Note that one of these transformations is the identity mapping from $Z_2^4 \to Z_2^4$, i.e. $P_0^*=P_0$ and $P_1^*=P_1$.

The invention claimed is:

1. A method for cryptographically converting an input data block into an output data block; the method including:
    selecting a select permutation from a predetermined set of at least two permutations, and
    performing a non-linear substitution operation on the input data block based on the select permutation,
    wherein the set of permutations is formed such that a cryptographic weakness in one of the permutations of the set is at least partially compensated by a corresponding cryptographic strength in at least one of the other permutations of the set.

2. A method as claimed in claim 1, wherein
    the data block consists of n data bits and
    each permutation of the set of permutations is a set of $2^n$ elements, where each non-trivial differential characteristic of each permutation in this set has a probability that is less than or equal to a maximum probability;
    the set of permutations being formed by permutations which have been selected such that for each non-trivial differential characteristic having the maximum probability in any of the permutations, this differential characteristic has a lower probability in at least one of the other permutations of the set.

3. A method as claimed in claim 2, wherein the differential characteristic has a probability equal to zero in at least one of the permutations.

4. A method as claimed in claim 3, wherein n=4, and the maximum probability equals $\frac{1}{4}$.

5. A method as claimed in claim 1, wherein
    the data block consists of n data bits and
    each permutation of the set of permutations is a set of $2^n$ elements, where each non-trivial linear characteristic of each permutation in this set has a probability of at least a minimum probability and at most a maximum probability,
    the set of permutations being formed by permutations which have been selected such that for each non-trivial linear characteristic with probability that equals the minimum or maximum probability in any of the permutations, this linear characteristic has a probability closer to $\frac{1}{2}$ in at least one of the other permutations of the set.

6. A method as claimed in claim 5, wherein the linear characteristic has a probability equal to $\frac{1}{2}$ in at least one of the permutations.

7. A method as claimed in claim 5, wherein n=4, the minimum probability is $\frac{1}{4}$, and the maximum probability is $\frac{3}{4}$.

8. A method as claimed in claim 1, wherein the set of permutations consists of two permutations.

9. A method as claimed in claim 8, wherein
    selecting the permutation is performed under control of a bit of an encryption key.

10. A method as claimed in claim 1, wherein
    selecting the select permutation is based on an encryption key.

11. A computer program product where the program product is operative to cause a processor to perform the method of claim 1.

12. A system for cryptographically converting an input data block in to an output data block; the system including:
    an input for receiving the input data block;
    a storage for storing a predetermined set of at least two permutations associated with an S-box;
    a cryptographic processor for performing a non-linear operation on the input data block using an S-box based on a permutation; the processor being operative to each time before using the S-box, (pseudo-)randomly selecting the permutation from the stored set of permutations associated with the S-box;
    an output for outputting the processed input data block; and
    wherein the set of permutations is formed such that a cryptographic weakness in one of the permutations of the set is at least partially compensated by a corresponding cryptographic strength in at least one of the other permutations of the set.

13. A cryptographic encoder comprising:
    one or more encryption stages,
    each stage of the one or more encryption stages including a non-linear substitution module that is configured to receive a control signal and a set of data bits,
    wherein
    the non-linear substitution module includes a plurality of substitution boxes;
    each of the substitution boxes is configured to receive at least a subset of the control signal and a subset of the set of data bits, and:
        substitutes a first output value for the subset of the set of data bits it the subset of the control signal is a first value, and
        substitutes a second output value for the subset of the set of data bits if the subset of the control signal is a second value, and
    the second output value is formed such that a cryptographic weakness in the first value is at least partially compensated by a corresponding cryptographic strength in the second output value.

14. The cryptographic encoder of claim 13, wherein
    each stage of the one or more encryption stages further includes
        an addition module that is configured to combine at least a subset of a key with a data input to provide the set of data bits to the non-linear substitution module.

15. The cryptographic encoder of claim 14, wherein
    the control signal includes another subset of the key.

16. The cryptographic encoder of claim 14, wherein
    each stage of the one or more encryption stages further includes
        a transformation module that is configured to transform the output values from the substitution boxes to provide therefrom an encrypted data output.

17. The cryptographic encoder of claim 13, wherein the subset of the set of data bits consists of n data bits and each of the first and second data output values is a mapping of the subset of the set of data bits to an element of a set of $2^n$ elements, where each non-trivial differential characteristic of each of the set of $2^n$ elements of the first and second output values has a probability that is less than or equal to a maximum probability;

the set of $2^n$ elements that provide second data output value being selected such that for each non-trivial differential characteristic having the maximum probability in the set of $2^n$ elements that provide the first output value, this differential characteristic has a lower probability in the set of $2^n$ elements that provide second data output value.

18. The cryptographic encoder of claim 13, wherein the subset of the set of data bits consists of n data bits and each of the first and second data output values is a mapping of the subset of the set of data bits to an element of a set of $2^n$ elements, where each non-trivial differential characteristic of each of the set of $2^n$ elements of the first and second output values has a probability that is at least a minimum probability and at most a maximum probability;

the set of $2^n$ elements that provide second data output value being selected such that for each non-trivial linear characteristic that equals the minimum or maximum probability in the set of $2^n$ elements that provide the first output value, this linear characteristic has a probability closer to ½ in the set of $2^n$ elements that provide second data output value.

* * * * *